United States Patent [19]

Kubo et al.

[11] Patent Number: 5,600,494

[45] Date of Patent: Feb. 4, 1997

[54] OBJECTIVE LENS SYSTEM OF AN OPTICAL DISK DEVICE

[75] Inventors: Wataru Kubo; Koichi Maruyama; Suguru Takishima, all of Tokyo, Japan

[73] Assignee: Asahi Kogaku Kogyo Kabushiki Kaisha, Tokyo, Japan

[21] Appl. No.: 571,514

[22] Filed: Dec. 13, 1995

[30] Foreign Application Priority Data

Dec. 14, 1994 [JP] Japan .................................. 6-333159

[51] Int. Cl.⁶ .................................................. G02B 13/18
[52] U.S. Cl. .................................... 359/719; 359/716
[58] Field of Search ................................. 359/785, 794, 359/716, 719

[56] References Cited

U.S. PATENT DOCUMENTS

| | | | |
|---|---|---|---|
| 4,556,296 | 12/1985 | Sugiyama | 359/785 |
| 5,050,970 | 9/1991 | Kittaka | 359/794 |
| 5,087,990 | 2/1992 | Maruyama | 359/794 |
| 5,173,809 | 12/1992 | Iwaki et al. | 359/784 |
| 5,214,537 | 5/1993 | Maruyama | 359/644 |

FOREIGN PATENT DOCUMENTS 61-56314  3/1986  Japan .

*Primary Examiner*—Scott J. Sugarman
*Attorney, Agent, or Firm*—Greenblum & Bernstein P.L.C.

[57] ABSTRACT

An objective lens system used in an optical system of an optical disk device. The objective lens system includes at least one lens element and converges light emitted from a light source onto a reflecting layer of an optical disk. The lens element has an offense against the sine condition OSC, and the optical disk has a substrate thickness T and a refractive index n. A ray of light exits the lens element and intersects an optical axis of the lens element at an angle $\alpha$. The values of OSC, $\alpha$, n and T satisfy the following relationship for light rays that are incident on the objective lens system at distances from the optical axis of the objective lens system which are least equal to a predetermined percentage of an effective height of an aperture of the objective lens:

$$0.5 < OSC / \left[ -\left( \frac{1}{n} - \sqrt{\frac{1 - \sin^2\alpha}{n^2 - \sin^2\alpha}} \right) \cdot T \right] < 1.5$$

Accordingly, a spherical aberration of the optical system is corrected. An offense against the sine condition of only the objective lens is substantially coincident with a spherical aberration of the objective lens such that a coma of only the objective lens is corrected.

11 Claims, 12 Drawing Sheets

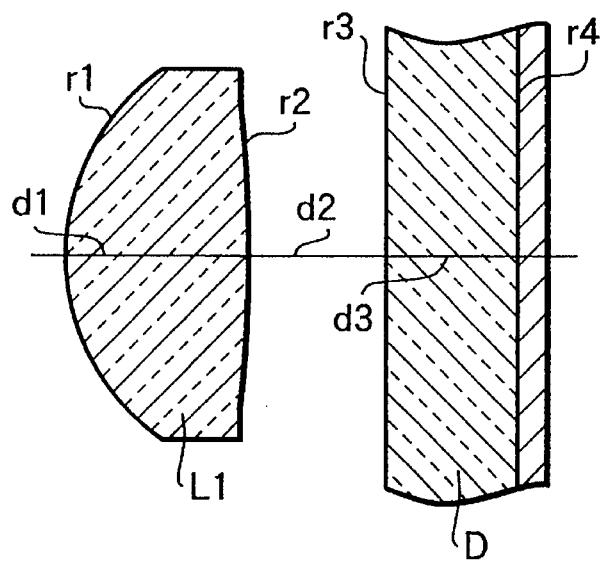
FIG. 1
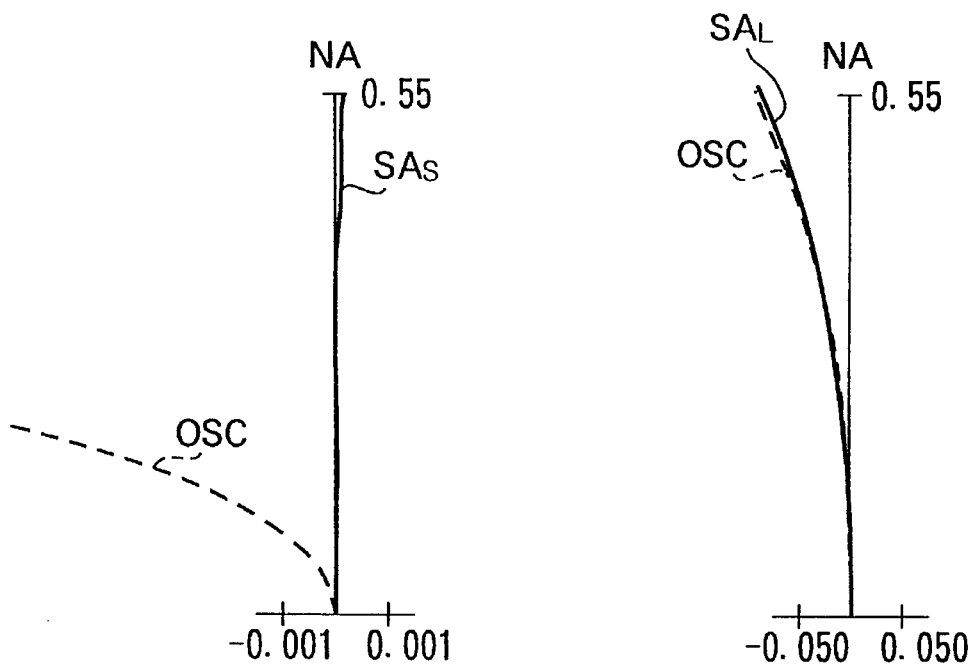
SAs: SPHERICAL ABERRATION OF SYSTEM (L1 & D)
OSC: OFFENSE AGAINST THE SINE CONDITION
FIG. 2A
SAL: SPHERICAL ABERRATION OF LENS(L1)
OSC: OFFENSE AGAINST THE SINE CONDITION
FIG. 2B

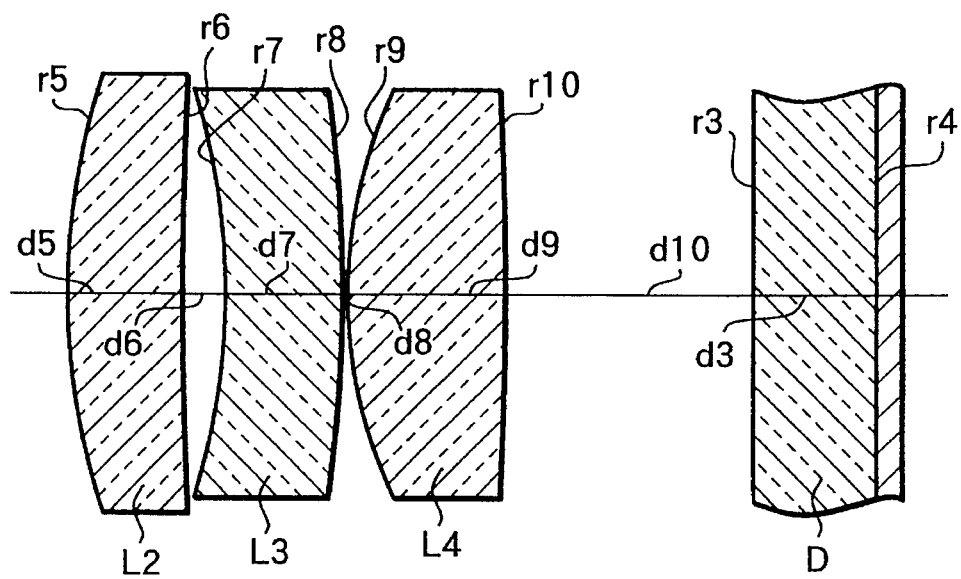
FIG. 7
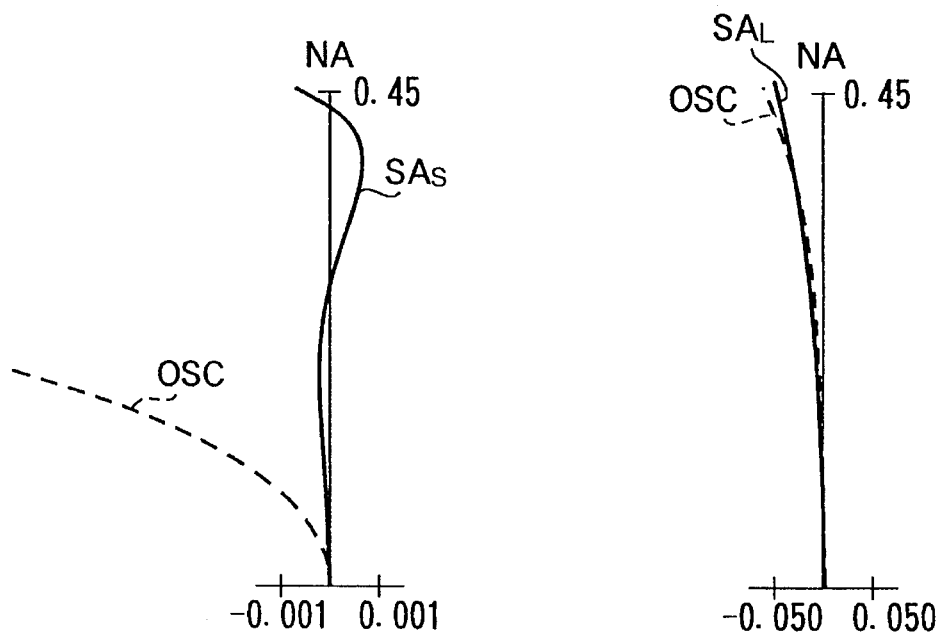
SAs: SPHERICAL ABERRATION
OF SYSTEM (L2,L3,L4 & D)
OSC: OFFENSE AGAINST
THE SINE CONDITION
FIG. 8A
SAL: SPHERICAL ABERRATION
OF LENS(L2,L3 & L4)
OSC: OFFENSE AGAINST
THE SINE CONDITION
FIG. 8B SAs : SPHERICAL ABERRATION
OF SYSTEM (L5 & D)
OSC : OFFENSE AGAINST
THE SINE CONDITION

SAL : SPHERICAL ABERRATION
OF LENS(L5)
OSC : OFFENSE AGAINST
THE SINE CONDITION

OBJECTIVE LENS SYSTEM OF AN OPTICAL DISK DEVICE

BACKGROUND OF THE INVENTION

The present invention relates to an objective lens system used in a device that reads data from an optical disk, by emitting converging laser light onto a reflective layer of the optical disk.

An optical disk such as a compact disk or a magneto-optical disk is composed of a substrate made from a resin or glass material, having a reflective aluminum layer coated on the substrate. The reflective surface of the optical disk stores digital audio, video or data information in the form of 'pits' and 'bumps'. The laser beam is transmitted through the substrate and reflected by the reflective layer. The pits and bumps modulate the reflected laser beam such that the stored digital information can be recovered.

Japanese Patent Laid Open Publication No. SHO 61-56314 discloses a known objective lens system in which both light refracting surfaces are aspherical. In the optical system of the above-mentioned publication, the converging laser light is incident on the substrate, which acts as a parallel plate and as a result, produces spherical aberrations. In order to obtain a good convergence of the laser light, the spherical aberration and comatic aberration (coma) of the entire optical system (i.e., the objective lens system and the substrate of the optical disk), were corrected.

When the objective lens system of this optical system is positioned so that the optical axis is perpendicular to the substrate, the aberrations are reduced to a low level. However, when the optical axis of the objective lens system is not perpendicular to the substrate, the convergence of the laser light on the reflective layer deteriorates because of the inherent coma of the objective lens system, since the aberrations produced by only the objective lens system were not corrected. When the convergence of the laser beam deteriorates, the diameter of the laser beam which is incident on the reflecting layer becomes larger. This increases the likelihood that an error in writing or reading data from the optical disk, will occur.

The convergence of the laser beam is determined by the positional relationship between the optical disk, the objective lens system and the angle of incidence of the laser beam on the objective lens system. In the conventional optical system the optical axis of the objective lens system must be maintained perpendicular to the optical disk in order to prevent the deterioration of the convergence of the laser light. Therefore, a complex adjustment of the objective lens system is required in order to align the optical axis of the objective lens system with the normal to the optical disk surface.

Further, since the objective lens system and the optical disk are driven independently, if the objective lens system is inclined during a tracking operation or a focusing operation, coma of the laser beam incident on the reflecting layer becomes larger even if the objective lens system is correctly adjusted for the case that the optical disk is not being rotated.

Conventionally, if the relationship between the optical disk and the objective lens system is correct, the convergence of the laser beam does not deteriorate that much even if the angle of incidence of the laser beam is inclined with respect to the optical axis of the objective lens system. However, if the optical axis of the objective lens system is inclined with respect to a normal of the optical disk, the convergence of the laser beam will deteriorate.

SUMMARY OF THE INVENTION

It is therefore an object of the present invention to provide an objective lens system for an optical disk device in which the amount of accuracy required in assembling the optical disk device is reduced.

It is another object of the present invention to provide an objective lens system for an optical disk device in which laser light passing through the objective lens system remains converged even when the optical axis of the objective lens system is inclined with respect to the normal of the optical disk during operation of the optical disk device.

According to a first aspect of the present invention, there is provided an objective lens system used in an optical system of an optical disk device that converges light emitted from a light source onto a reflecting layer of an optical disk. The objective lens system includes at least one lens element. The lens element has an offense against the sine condition OSC, and the optical disk has a substrate thickness T and a refractive index n. A ray of the light exits the lens element and intersects an optical axis of the lens element with an angle $\alpha$. The values of $\alpha$, OSC, n and T satisfy the following relationship for light rays which are incident on the objective lens system at distances from the optical axis of the objective lens system which are at least equal to a predetermined percentage of the height of an effective aperture of the objective lens system:

$$0.5 < OSC / \left[ -\left( \frac{1}{n} - \sqrt{\frac{1-\sin^2\alpha}{n^2-\sin^2\alpha}} \right) \cdot T \right] < 1.5$$

Accordingly, a spherical aberration of the optical system is corrected. Further, an offense against the sine condition of only the objective lens system is substantially coincident with a spherical aberration of the objective lens system such that a coma of only the objective lens system is corrected. Thus, even if the optical axis of the objective lens system is not coincident with the normal to the optical disk, the convergence of a laser beam used with the objective lens system is affected much less than the convergence of a laser beam used with a conventionally designed objective lens system.

Alternatively, if light is incident on the objective lens system at distances from the optical axis that are at least equal to 70% of the height of the effective aperture, then the above relationship will be satisfied.

In a preferred embodiment, the objective lens system has a single positive lens. In this case, the above relationship is satisfied while minimizing the cost of the objective lens system.

Alternatively, the objective lens system has three lenses. In this case, the effect on the convergence of the laser beam is minimized even as an angle between the optical axis of the objective lens system, and the normal to the optical disk becomes larger.

According to a second aspect of the present invention, there is provided an objective lens system used in an optical system of an optical disk device that converges light emitted from a light source onto a reflecting layer of an optical disk. The objective lens system includes three lens elements. The objective lens system has an offense against the sine condition OSC, and the optical disk has a substrate thickness T and a refractive index n. A ray of the light exits the lens element and intersects an optical axis of the lens element with an angle α. The values of α, OSC, n and T satisfy the following relationship for light rays that are incident on the objective lens system at distances from the optical axis of the objective lens system which are at least equal to a predetermined percentage of the height of an effective aperture of the objective lens system:

$$0.5 < OSC \Bigg/ \left[ -\left( \frac{1}{n} - \sqrt{\frac{1-\sin^2\alpha}{n^2-\sin^2\alpha}} \right) \cdot T \right] < 1.5$$

Accordingly, a spherical aberration of the optical system is corrected. Further, an offense against the sine condition of only the objective lens system is substantially coincident with a spherical aberration of the objective lens system such that a coma of only the objective lens system is corrected.

According to a third aspect of the present invention, there is provided an objective lens system used in an optical system of an optical disk device that converges light emitted from a light source onto a reflecting layer of an optical disk. The objective lens system includes at least one lens element. The lens element has an offense against the sine condition OSC, and the optical disk has a substrate thickness T and a refractive index n. A ray of the light exits the lens element and intersects an optical axis of the lens element with an angle α. The values of α, OSC, n and T satisfy the following relationship for light rays which are incident on a portion of the objective lens system:

$$0.5 < OSC \Bigg/ \left[ -\left( \frac{1}{n} - \sqrt{\frac{1-\sin^2\alpha}{n^2-\sin^2\alpha}} \right) \cdot T \right] < 1.5$$

Accordingly, a spherical aberration of the optical system is corrected. Further, an offense against the sine condition of only the objective lens system is substantially coincident with a spherical aberration of the objective lens system such that a coma of only the objective lens system is corrected.

BRIEF DESCRIPTION OF THE DRAWINGS

FIG. 1 is a schematic of an optical system having an optical disk and an objective lens system according to a first embodiment of the present invention;

FIG. 2A is a graph showing the spherical aberration and the offense against the sine condition of the optical system shown in FIG. 1;

FIG. 2B is a graph showing the spherical aberration and the offense against the sine condition of only the objective lens system shown in FIG. 1;

FIG. 7 is a schematic of an optical system having an optical disk and an objective lens system according to a second embodiment of the present invention;

FIG. 8A is a graph showing the spherical aberration and the offense against the sine condition of the optical system shown in FIG. 7;

FIG. 8B is a graph showing the spherical aberration and the offense against the sine condition of only the objective lens system shown in FIG. 7;

DETAILED DESCRIPTION OF THE EMBODIMENTS

Figure 3:
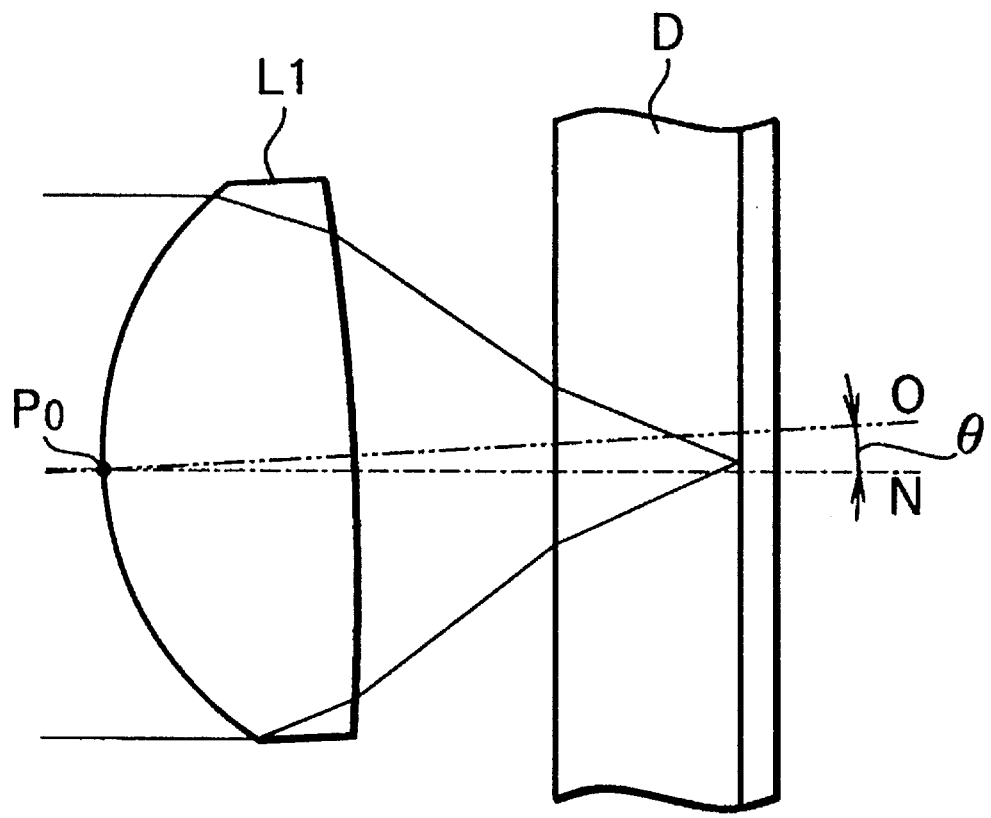
FIG. 3 is a schematic of the optical system shown in FIG. 1 when an optical axis of the objective lens system is inclined with respect to a normal of the optical disk.

The embodiment of the present invention will now be described with reference to the drawings.

FIG. 1 shows an optical system having an objective lens system L1 according to a first embodiment of the present invention, and a substrate D of an optical disk. In the first embodiment, only the single lens L1 (hereinafter referred to as lens L1) is employed.

The lens L1 has radii of curvature r1 and r2, a refractive index (at a wavelength of 780 nm) n1, a thickness d1, an Abbe number v1, and a refractive index (at a wavelength of 588 nm, i.e., the d-line) $n_{d1}$. The surfaces of the lens L1 are both aspherical surfaces. The lens L1 also has a numerical aperture NA1, a focal length f1, and a half angle of view ω1. Further, a back focal length fb1 is given for the lens L1 without the substrate D.

The substrate D has radii of curvature r3 and r4. The substrate D has refractive index (at a wavelength of 780 nm) n3, a thickness d3, an Abbe number v3 and a refractive index (at a wavelength of 588 nm, i.e., the d-line) $n_{d3}$. Further, d2 denotes a distance between the lens L1 and the substrate D, along the optical axis.

Table 1 below summarizes the values for the above variables for the lens L1, and the substrate D.

TABLE 1

| NA1 = 0.55 | f1 = 3.01, ω1 = 0.6°, fb1 = 2.06 | | | |
|---|---|---|---|---|
| # | r# | d# | n# | v# | $n_{d\#}$ |
| 1 | 1.808 | 1.630 | 1.53677 | 55.6 | 1.54358 |
| 2 | −10.366 | 1.299 | | | |
| 3 | ∞ | 1.200 | 1.57346 | 29.9 | 1.58547 |
| 4 | ∞ | | | | |

The surfaces of the lens are described by the following equation (1):

$$X = \frac{CY^2}{1 + \sqrt{1-(1+K)C^2Y^2}} + A4Y^4 + A6Y^6 + A8Y^8 + A10Y^{10} \quad (1)$$

where

X is defined as the sag (sagitta) of the aspherical surface of the lens,

Y is the height from the optical axis for a given point X,

C is the curvature (1/r) of the vertex of the aspherical surface,

K is the coefficient of a circular cone, and

A4, A6, A8 and A10 are aspherical surface coefficients. These coefficients are as shown in Table 2 below.

TABLE 2

| First Surface (r1) | Second Surface (r2) |
|---|---|
| K = −0.5100 | K = 0.00000 |
| A4 = 0.21010 × 10⁻² | A4 = 0.18989 × 10⁻¹ |
| A6 = −0.19669 × 10⁻³ | A6 = −0.90709 × 10⁻² |
| A8 = −0.27167 × 10⁻⁴ | A8 = 0.20662 × 10⁻² |
| A10 = −0.70000 × 10⁻⁴ | A10 = −0.19606 × 10⁻³ |

With the lens L1 designed according to the above parameters, the coma of only the lens L1 is corrected, while the spherical aberration of the whole optical system is corrected.

FIG. 2A shows the spherical aberration $SA_S$ and the offense against the sine condition OSC for the whole optical system (i.e., the lens L1 and the substrate D). Since the spherical aberrations $SA_S$ is corrected for the whole optical system, as described above, the amount of spherical aberration is low.

FIG. 2B shows the spherical aberration $SA_L$ and the offense against the sine condition OSC for only the objective lens system L1.

In an optical system in which the spherical aberration is corrected, coma can be corrected when the sine condition is satisfied. However, in an optical system in which the spherical aberration is not completely corrected, the coma can be corrected when the offense against the sine condition OSC is substantially coincident with the spherical aberration. The value of the OSC is determined by the construction of the lens, and is not dependent on the construction of the substrate.

In the optical system shown in FIG. 1, the spherical aberration is corrected for the entire system including the lens L1 and the substrate D. Therefore, the spherical aberration $SA_L$ of only the lens L1 is not corrected. When the OSC is substantially coincident with the spherical aberration $SA_L$ of the lens L1, the coma of the lens L1 can be corrected.

In order to completely correct the spherical aberration of the entire optical system, the spherical aberration $SA_L$ of the lens should cancel the spherical aberration $SA_D$ of the substrate D. That is, the sum of $SA_L$ and $SA_D$ should be equal to zero. The spherical aberration $SA_D$ of the substrate D is given by the following equation:

$$SA_D = \left( \frac{1}{n} - \sqrt{\frac{1-\sin^2\alpha}{n^2-\sin^2\alpha}} \right) \cdot T \quad (2)$$

where,

α is the angle between a ray of light exiting the lens L1, and an optical axis of the objective lens system, n is the refractive index of the substrate D, and T is the thickness of the substrate D.

When the spherical aberration of the entire optical system is completely corrected, the spherical aberration $SA_L$ of the lens L1 is given by equation (3) below:

$$SA_L + -SA_D = -\left( \frac{1}{n} - \sqrt{\frac{1-\sin^2\alpha}{n^2-\sin^2\alpha}} \right) \cdot T \quad (3)$$

The OSC does not have to be exactly the same as the spherical aberration $SA_L$ of the lens in order to substantially reduce the coma. The coma will be substantially reduced if the OSC satisfies equation (4) given below:

$$0.5 < OSC/SA_L < 1.5 \quad (4)$$

or in other words, $$0.5 < OSC/\left[ -\left( \frac{1}{n} - \sqrt{\frac{1-\sin^2\alpha}{n^2-\sin^2\alpha}} \right) \cdot T \right] < 1.5 \quad (4)$$

In the first embodiment, the thickness of the substrate D (i.e., d3) is 1.2 mm and the height of the effective aperture of the lens L1 is 1.65 mm. In this specification the height of the effective aperture is defined as equal to one half of the diameter of the effective aperture of the objective lens system.

Table 3 shows the values of the OSC and the value of $-OSC/SA_D$ for light incident on the lens L1 at different normalized distances from the optical axis (i.e., a normalized distance of 1.0 is equivalent to light being incident at the outer edge of the effective aperture of the lens L1). The corresponding distance of the light ray from the optical axis (i.e., D/2), and values of Sin α are also given.

TABLE 3

| Normalized distance of light from opt. axis | Height (D/2) | Sin α | OSC | $-SA_D$ | $-OSC/SA_D$ |
| --- | --- | --- | --- | --- | --- |
| 1.0 | 1.650 | 0.5484 | −0.0917 | −0.0823 | 1.1141 |
| 0.9 | 1.485 | 0.4935 | −0.0745 | −0.0642 | 1.1608 |
| 0.8 | 1.320 | 0.4387 | −0.0553 | −0.0491 | 1.1267 |
| 0.7 | 1.155 | 0.3838 | −0.0383 | −0.0366 | 1.0479 |
| 0.6 | 0.990 | 0.3290 | −0.0249 | −0.0262 | 0.9492 |
| 0.5 | 0.825 | 0.2742 | −0.0152 | −0.0179 | 0.8506 |
| 0.4 | 0.660 | 0.2193 | −0.0086 | −0.0113 | 0.7637 |
| 0.3 | 0.495 | 0.1645 | −0.0044 | −0.0063 | 0.7029 |
| 0.2 | 0.330 | 0.1097 | −0.0018 | −0.0028 | 0.6524 |
| 0.1 | 0.165 | 0.0548 | −0.0004 | −0.0007 | 0.5828 |

As shown in Table 3, equation (4) will be satisfied for all light rays incident on the lens L1.

Further, coma is given by the difference between the spherical aberration curve and the sine condition curve. As shown in FIG. 2B, the coma of the objective lens L1 has been corrected. Therefore, the effect on the wavefront aberration by the coma will be small.

FIG. 3 shows an angle θ of inclination between the optical axis $P_0O$ of the optical system shown in FIG. 1 (i.e., lens L1) and a line $P_0N$ normal to the optical disk. The optical axis $P_0O$ and the line $P_0N$ intersect at the point $P_0$.

Figure 4:
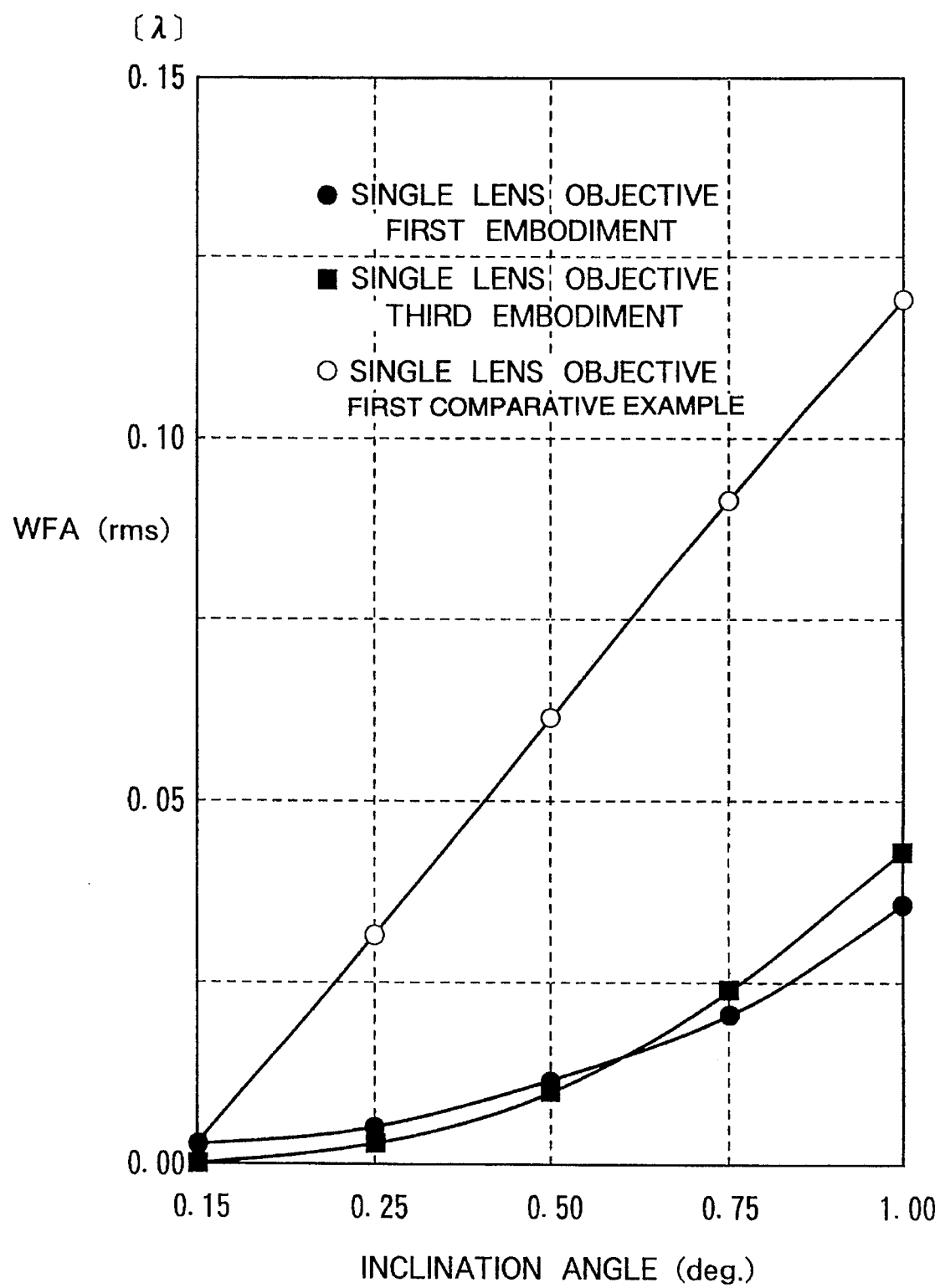
FIG. 4 is a graph showing the relationship between an inclination angle of the optical axis of the objective lens system and the amount of wavefront aberration, for the optical system shown in FIG. 1, and a first comparative example.

FIG. 4 is a graph showing the relationship between an inclination angle (horizontal axis, unit: degree) and wavefront aberration WFA (vertical axis, unit: rms—root mean square), for the single objective lens of the optical system of the first embodiment and a single objective lens for an optical system according to a first comparative example.

In the first comparative example, the objective lens system is designed according to a conventional lens designing method. Therefore, the spherical aberration and coma are corrected for the entire optical system, including the substrate. However, other parameters of the objective lens system such as the focal length, and the effective aperture are the same as those of the objective lens system of the first embodiment.

When the objective lenses of both optical systems are not inclined, the wavefront aberration of the single objective lens according to the first embodiment and the wavefront aberration of the single objective lens according to the first comparative example are low.

Since the coma of the entire optical system of the first comparative example has been corrected, the wavefront aberration greatly increases as the angle of inclination of the optical axis of the objective lens of the first comparative example increases with respect to the normal of the optical disk. This is because the objective lens of the first comparative example has coma, and therefore, equation (4) is not satisfied.

However, since the coma of only the objective lens of the optical system of the first embodiment has been corrected, the wavefront aberration increases slightly as the angle of inclination of the optical axis of the objective lens of the first embodiment increases with respect to the normal of the optical disk. Further, equation (4) is satisfied.

There is also wavefront aberration due to astigmatism for both the optical system of the first embodiment and the optical system of the first comparative example. However, the amount of aberration due to astigmatism is much smaller than the amount of aberration due to coma.

Figure 5A:
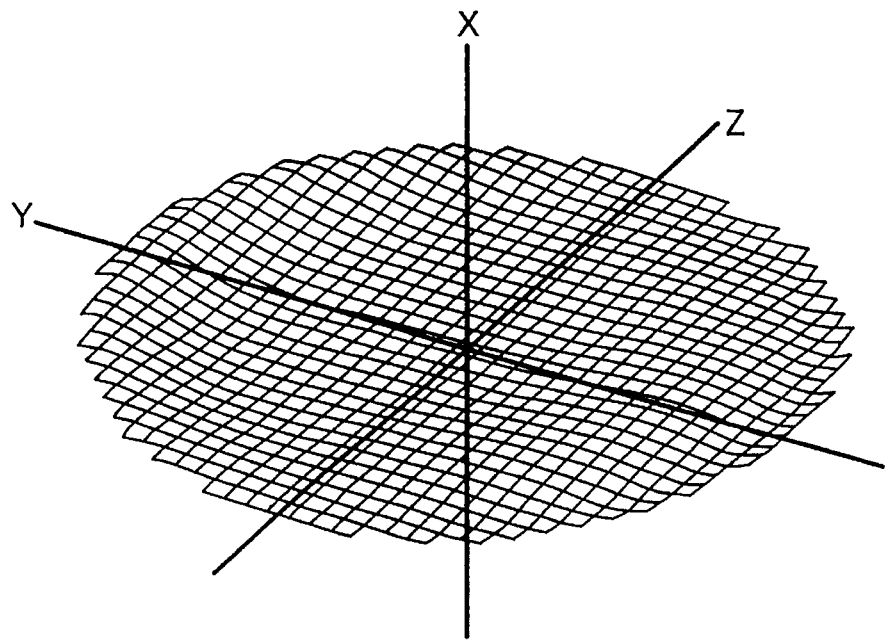
FIG. 5A is a three-dimensional graph showing the wavefront pattern when the optical axis of the objective lens system shown in FIG. 1 is inclined with respect to a normal of the optical disk, by 0.5°.

FIG. 5A shows a three dimensional graph of the wavefront patterns on a reflecting layer of the optical disk. In FIG. 5A, the X axis is parallel to the normal of the optical disk, and passes through a center of the laser beam spot. The Y axis and Z axis are both perpendicular to the X axis. Further, the wavefront pattern shown in FIG. 5A occurs when the optical axis of the objective lens L1 is inclined with respect to the normal of the optical disk by 0.5 degree, in the X-Y plane.

Figure 5B:
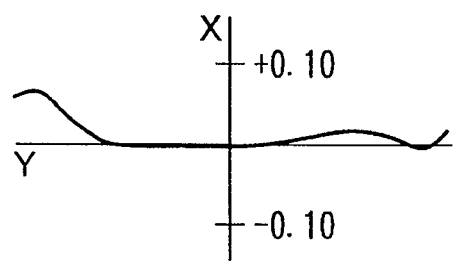
FIGS. 5B and 5C show XY and XZ sections, respectively, of the three dimensional wavefront pattern shown in FIG. 5A.
Figure 5C:
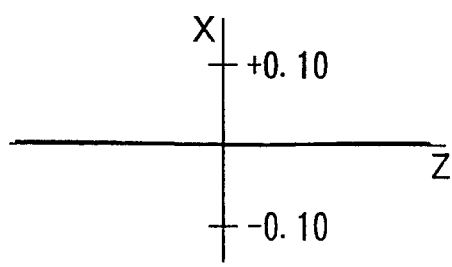

FIG. 5B shows an XY section of the pattern shown in FIG. 5A, while FIG. 5C shows an XZ section of the pattern shown in FIG. 5A.

In this case the average amount of wavefront aberration is about 0.011 λ (rms), as shown in FIG. 4. Further, the maximum amount of wavefront aberration is less than 0.1 λ, as shown in FIG. 5B.

Figure 6A:
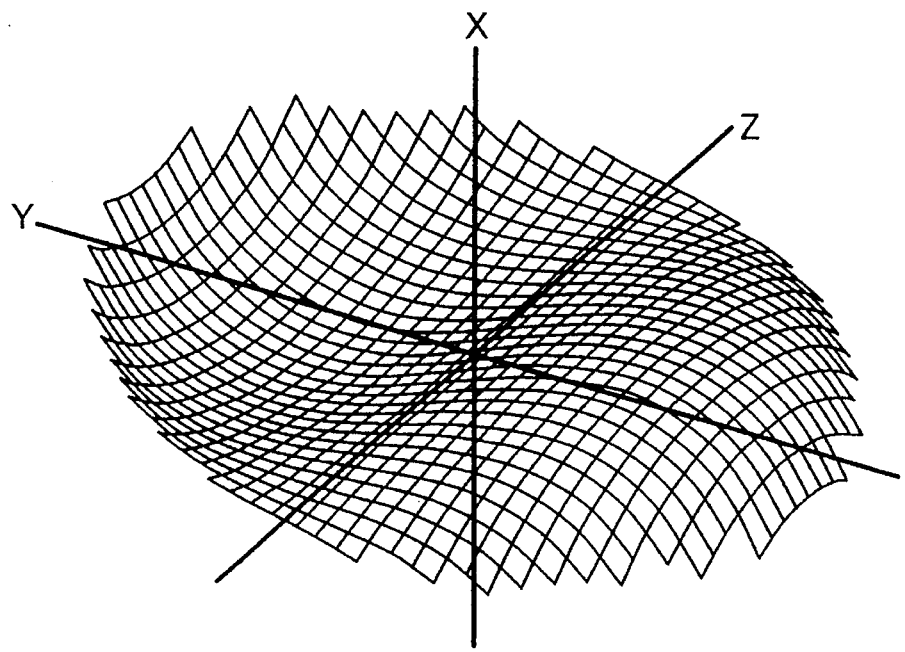
FIG. 6A is a three-dimensional graph showing the wavefront pattern when the optical axis of the objective lens system of the first comparative example is inclined with respect to the normal of the optical disk, by 0.5°.
Figure 6B:
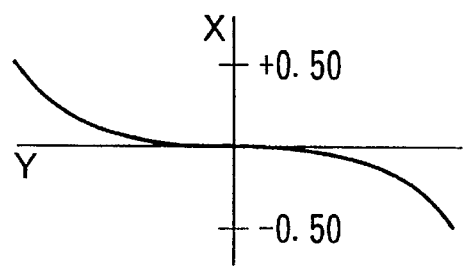
FIGS. 6B and 6C show XY and XZ sections, respectively, of the three dimensional wavefront pattern shown in FIG. 6A.

FIG. 6A shows a three dimensional graph of the wavefront patterns when the optical axis of the single objective lens according to the first comparative example, is inclined with respect to the normal of the optical disk by 0.5 degree. FIG. 6B shows an XY section of the pattern shown in FIG. 6A, while FIG. 6C shows an XZ section of the pattern shown in FIG. 6A.

In this case, the average amount of wavefront aberration is about 0.060 λ (rms), as shown in FIG. 4. Further, the maximum amount of wavefront aberration is more than 0.5 λ, as shown in FIG. 6B.

Figure 6C:
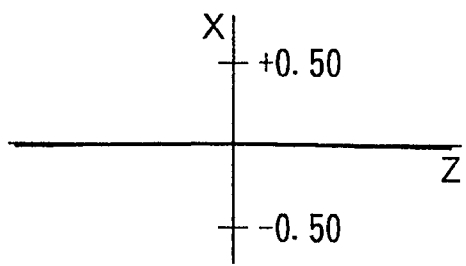

By comparing FIGS. 5A, 5B and 5C with FIGS. 6A, 6B and 6C, the wavefront undulation of the objective lens system of the first embodiment is much smaller than the wavefront undulation of the single objective lens according to the first comparative example. Therefore, the amount of wavefront aberration of the objective lens system according to the first embodiment is smaller, and as a result, the diameter of the light spot incident on the reflecting layer of the optical disk is smaller.

As described above, by using the objective lens system of the optical system of the first embodiment, the spot diameter of the light incident on the reflecting surface of the optical disk can be kept small even if the optical axis of the objective lens system is inclined with respect to the normal of the optical disk during the tracking operation or the focusing operation. Therefore, the probability that a reading error or a writing error will occur, is reduced.

Further, as the objective lens system does not need to be accurately aligned with respect to the plane of the optical disk, the amount of time and cost required to assemble the optical system can be reduced.

If the objective lens system is designed such that the coma is corrected for the entire optical system, the optical axis of the objective lens system must be perpendicular to the optical disk. Therefore, the optical disk device requires an accurate mechanism for driving the objective lens system during the focusing operation so as not to incline the optical axis of the objective lens system with respect to the normal of the optical disk.

However, as described above, the driving mechanism of an optical disk device which uses the objective lens system designed according to the method of the present invention, can be simplified since the tolerance of the inclination of the lens is large. Therefore, a highly accurate driving mechanism is not required for the optical disk device which employs the objective lens system of the present invention. Thus, the design of the driving mechanism can be simplified and the cost of the optical disk device can be reduced.

FIG. 7 shows an optical system, according to a second embodiment of the present invention. The optical system includes an objective lens system and the substrate D. The objective lens systems consists of a positive lens L2, a negative lens L3 and a positive lens L4 arranged in this order from a light source side (i.e., from left to right in FIG. 8).

The lens L2 has radii of curvature r5 and r6, a refractive index (at a wavelength of 780 mm) n5, a thickness d5, an Abbe number v5, and a refractive index (at a wavelength of 588 mm, i.e., the d-line) $n_{d5}$.

The lens L3 has radii of curvature r7 and r8, a refractive index (at a wavelength of 780 mm) n7, a thickness d7, an Abbe number v7, and a refractive index (at a wavelength of 588 mm, i.e., the d-line) $n_{d7}$.

the lens L4 has radii of curvature r9 and r10, a refractive index (at a wavelength of 780 mm) n9, a thickness d9, an Abbe number v9, and a refractive index (at a wavelength of 588 mm, i.e., the d-line) $n_{d9}$.

Further, as shown in FIG. 7, d6 denotes a distance between the lenses L2 and L3 along the optical axis, d8 denotes a distance between the lenses L3 and L4 along the optical axis; and d10 denotes a distance between the lens L4 and the substrate D.

Also, in the second embodiment, the objective lens system has a numerical aperture NA2, a focal length f2, a half angle of view ω2, and a back focal length fb2.

Table 4 below summarizes the values for the above variables for the lenses L2, L3, and L4 (determined experimentally), and the substrate D.

TABLE 4

| | NA2 = 0.45 | f2 = 4.50 | ω2 = 0.4° | fb2 = 3.11 | |
|---|---|---|---|---|---|
| # | r# | d# | n# | v# | $n_{d\#}$ |
| 3 | ∞ | 1.200 | 1.57346 | 29.9 | 1.58547 |
| 4 | ∞ | | | | |
| 5 | 6.625 | 1.100 | 1.78565 | 25.4 | 1.80518 |
| 6 | 210.236 | 0.400 | | | |
| 7 | −5.588 | 1.100 | 1.65947 | 32.1 | 1.67270 |
| 8 | −12.197 | 0.050 | | | |
| 9 | 4.385 | 1.500 | 1.78565 | 25.4 | 1.80518 |
| 10 | −69.206 | 2.345 | | | |

FIG. 8A shows the spherical aberration $SA_s$ and the offense against the sine condition OSC for the whole optical system (i.e., the objective lenses L2, L3 and L4 and the substrate D). Since the spherical aberration $SA_s$ is corrected for the whole optical system, as described above, the amount of spherical aberration is low.

FIG. 8B shows the spherical aberration $SA_L$ and the offense against the sine condition OSC for only the objective lens system L2, L3 and L4. As mentioned above, for an optical system in which the spherical aberration is corrected, if the objective lens system is to have reduced coma, equation (4) must be satisfied.

In the second embodiment the thickness of the substrate D (i.e., d3) is 1.2 mm and the height of the effective aperture of the objective lens system L2, L3 and L4 is 2.03 mm.

Table 5 shows the values of the OSC and the value of $-OSC/SA_D$ for light incident on the lens L2 at different normalized distances from the optical axis. The corresponding values for the height (D/2) and Sin α, are also given.

TABLE 5

| Normalized distance of light from opt. axis | Height (D/2) | Sin α | OSC | $-SA_D$ | $-OSC/SA_D$ |
|---|---|---|---|---|---|
| 1.0 | 2.030 | 0.4511 | −0.0695 | −0.0523 | 1.3298 |
| 0.9 | 1.827 | 0.4060 | −0.0474 | −0.0413 | 1.1469 |
| 0.8 | 1.624 | 0.3609 | −0.0323 | −0.0320 | 1.0101 |
| 0.7 | 1.421 | 0.3158 | −0.0218 | −0.0240 | 0.9066 |
| 0.6 | 1.218 | 0.2707 | −0.0144 | −0.0174 | 0.8278 |

TABLE 5-continued

| Normalized distance of light from opt. axis | Height (D/2) | Sin α | OSC | $-SA_D$ | $-OSC/SA_D$ |
|---|---|---|---|---|---|
| 0.5 | 1.015 | 0.2256 | −0.0091 | −0.0119 | 0.7630 |
| 0.4 | 0.812 | 0.1804 | −0.0054 | −0.0076 | 0.7147 |
| 0.3 | 0.609 | 0.1353 | −0.0029 | −0.0042 | 0.6878 |
| 0.2 | 0.406 | 0.0902 | −0.0012 | −0.0019 | 0.6440 |
| 0.1 | 0.203 | 0.0451 | −0.0003 | −0.0005 | 0.6462 |

As shown in Table 5, equation (4) will be satisfied for all light rays incident on the objective lens system.

As shown in FIG. 8B, the coma of the objective lens L2, L3 and L4 has been corrected. Therefore, the effect on the wavefront aberration by the coma will be small.

Figure 9:
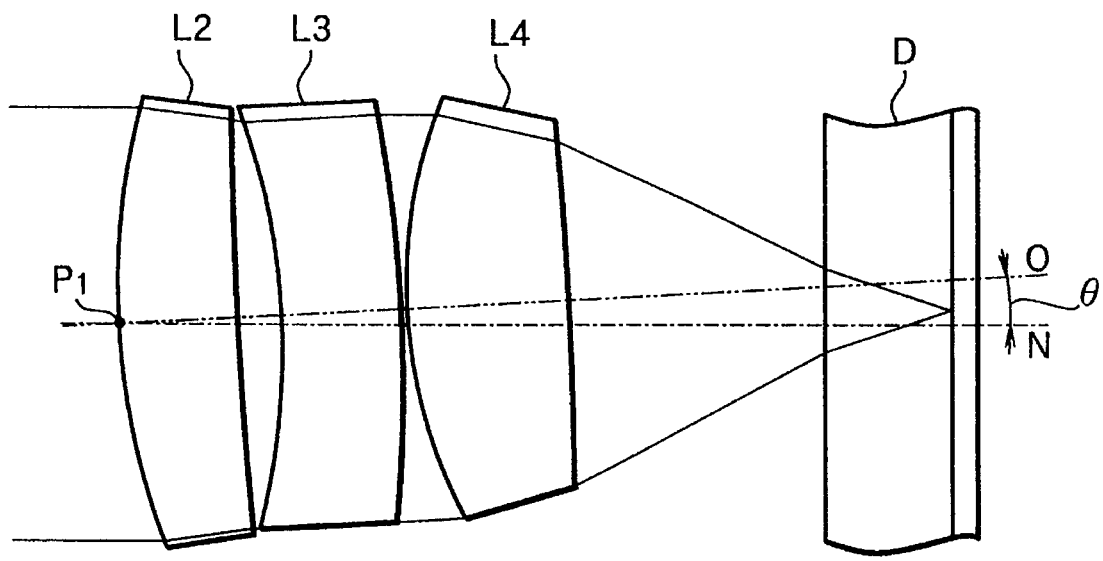
FIG. 9 is a schematic of the optical system shown in FIG. 7 when an optical axis of the objective lens system is inclined with respect to a normal of the optical disk.

FIG. 9 shows an angle θ of inclination between the optical axis $P_1O$ of the optical lens system shown in FIG. 7 (i.e., the lenses L2, L3 and L4 of the multiple objective lens) and the line normal $P_1N$ to the optical disk. The optical axis $P_1O$ and the normal line $P_1N$ intersect at point $P_1$.

Figure 10:
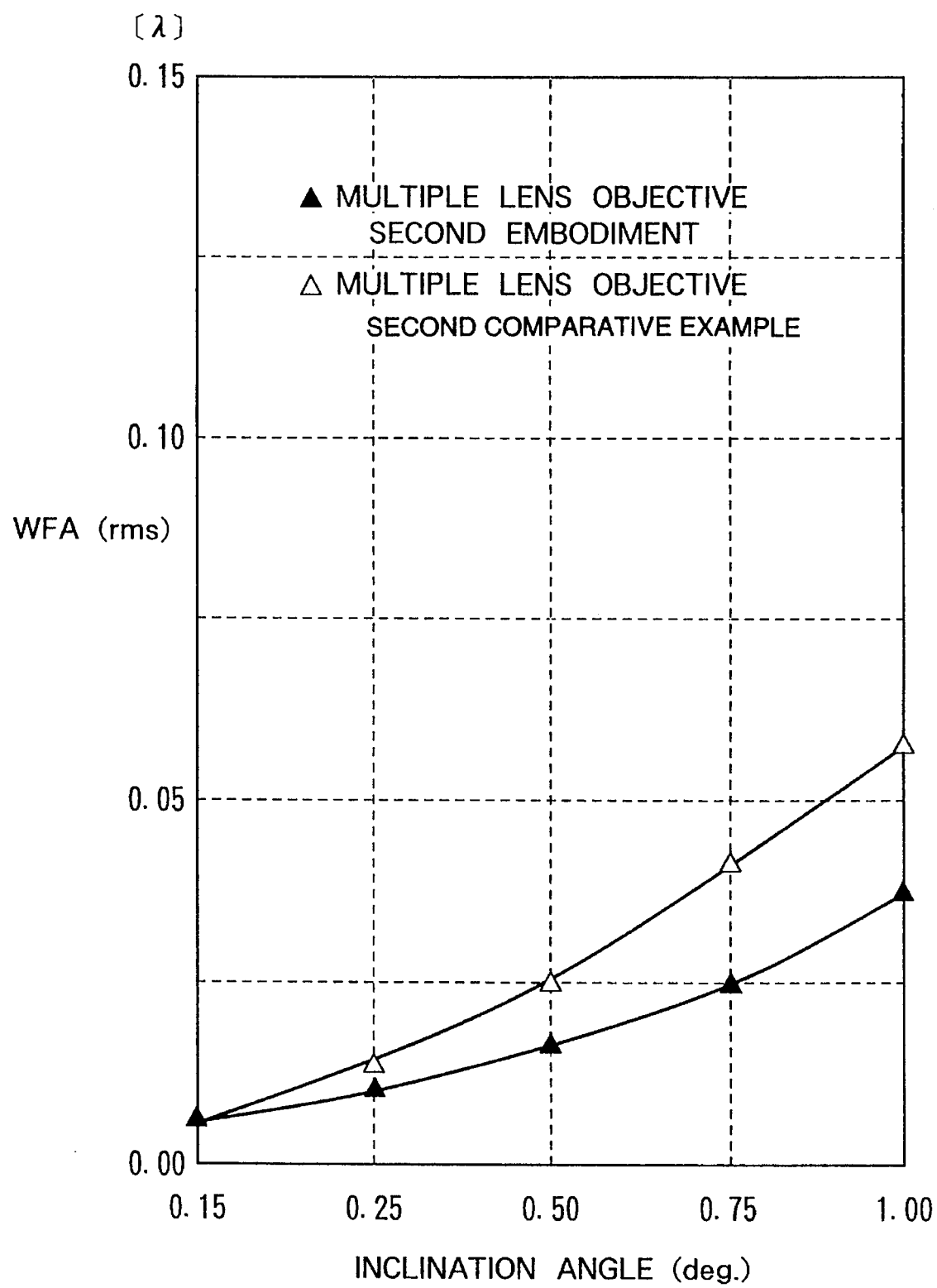
FIG. 10 is a graph showing the relationship between an inclination angle of the optical axis of the objective lens system and the amount of wavefront aberration, for the objective lens system shown in FIG. 7 and a second comparative example.

FIG. 10 is a graph showing the relationship between an inclination angle (horizontal axis, unit: degree) and wavefront aberration WFA (vertical axis, unit: rms—root mean square), for the multiple objective lens of the optical system of the second embodiment and a multiple objective lens of an optical system according to a second comparative example.

In the second comparative example, the multiple objective lens system is designed according to a conventional method, and therefore the coma of the entire optical system, including the substrate D, is corrected.

When the objective lens of both optical systems is not inclined, the wavefront aberration of the multiple objective lens of the optical system of the second embodiment and the wavefront aberration of the multiple objective lens of the optical system of the second embodiment and the wavefront aberration of the multiple objective lens according to the second comparative example, are low (approximately zero).

Since the coma of the entire optical system of the second comparative example has been corrected, the wavefront aberration greatly increases as the angle of inclination of the optical axis of the objective lens system of the second comparative example increases with respect to the normal of the optical disk. This is because the objective lens system of the second comparative example has coma, and therefore, equation (4) is not satisfied.

However, since the coma of only the objective lens system of the optical system of the second embodiment has been corrected, the wavefront aberration increases slightly as the angle of inclination of the optical axis of the objective lens system of the second embodiment increases with respect to the normal of the optical disk. Further, equation (4) is satisfied.

There is also wavefront aberration due to astigmatism for both the optical system of the second embodiment and the optical system according to the second comparative example. However, the amount of aberration due to astigmatism is much smaller than the amount of aberration due to coma.

Figure 11A:
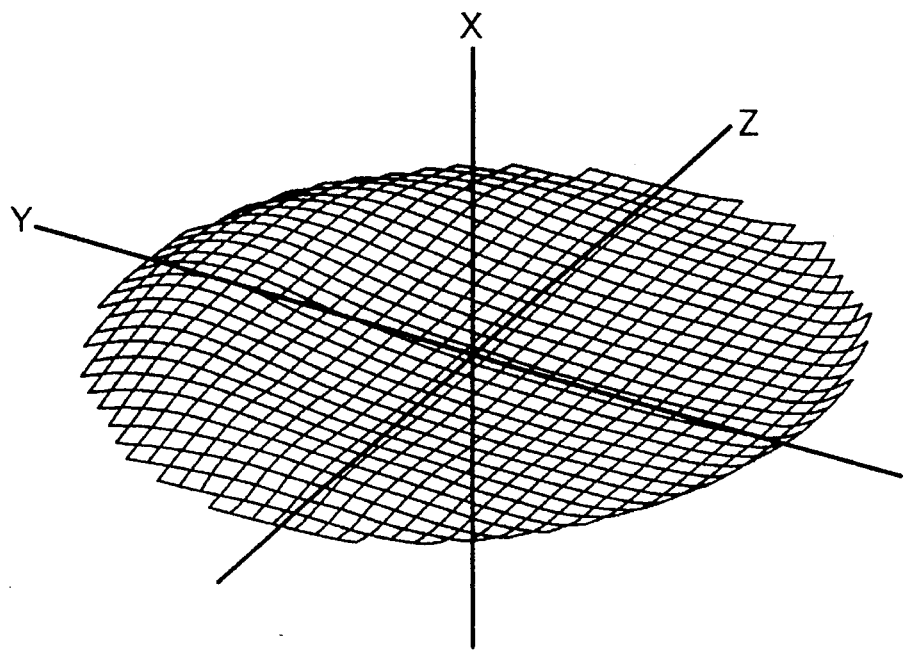
FIG. 11A is a three-dimensional graph showing the wavefront pattern when the optical axis of the objective lens system shown in FIG. 7 is inclined with respect to the normal of the optical disk, by 0.5°.
Figure 11B:
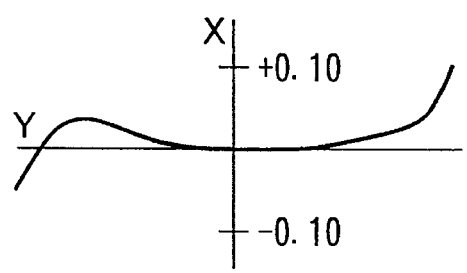
FIGS. 11B and 11C show XY and XZ sections, respectively, of the three dimensional wavefront pattern shown in FIG. 11A.
Figure 11C:
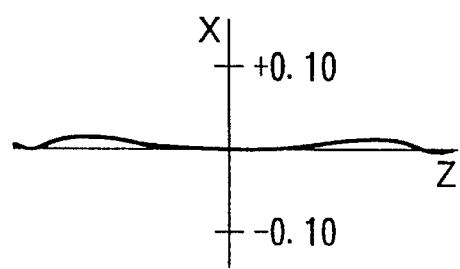

FIG. 11A shows a three dimensional graph of the wavefront patterns when the optical axis of the objective lenses L2, L3 and L4 is inclined with respect to the normal of the optical disk by 0.5 degrees. FIG. 11B shows an XY section of the pattern shown in FIG. 11A, while FIG. 11C shows an XZ section of the pattern shown in FIG. 11A.

In this case the average amount of wavefront aberration is about 0.017λ (rms), as shown in FIG. 10. Further, the maximum amount of wavefront aberration is less than 0.1λ, as shown in FIG. 11B.

Figure 12A:
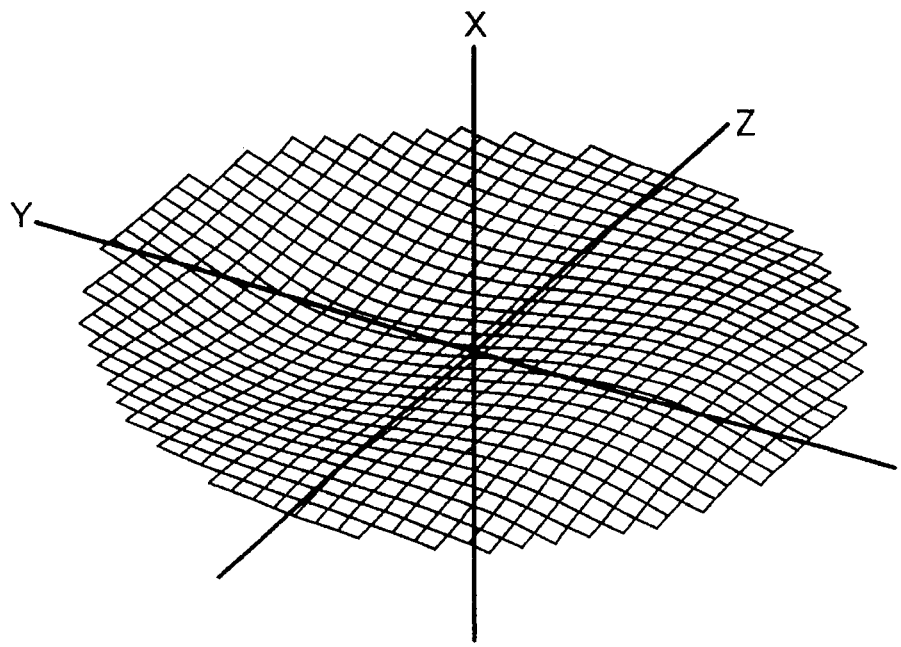
FIG. 12A is a three dimensional graph showing the wavefront pattern when the optical axis of the objective lens system of the second comparative example is inclined with respect to the normal to the optical disk, by 0.5°.
Figure 12B:
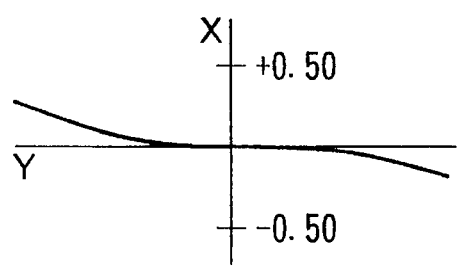
FIGS. 12B and 12C show XY and XZ sections, respectively, of the three dimensional wavefront pattern shown in FIG. 12A.

FIG. 12A shows a three dimensional graph of the wavefront patterns when the optical axis of the multiple objective lens according to second comparative example is inclined with respect to the normal of the optical disk by 0.5 degree. FIG. 12B shows an XY section of the pattern shown in FIG. 12A, while FIG. 12C shows an XZ section of the pattern shown in FIG. 12A.

In this case, the average amount of wavefront aberration is about 0.025λ (rms), as shown in FIG. 10. Further, the maximum amount of wavefront aberration is more than 0.25λ, as shown in FIG. 12B.

Figure 12C:
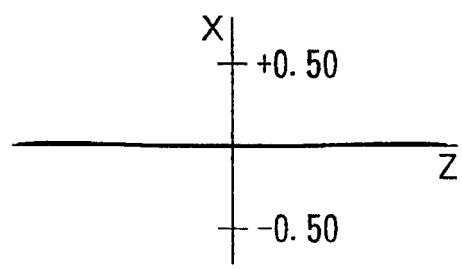

By comparing FIGS. 11A, 11B and 11C with FIGS. 12A, 12B and 12C, the wavefront undulation of the multiple objective lens system of the optical system of the second embodiment is much smaller than the wavefront undulation of the multiple objective lens system of the optical system according to the second comparative example. Therefore, the amount of wavefront aberration of the objective lens system according to the second embodiment is smaller, and as a result, the diameter of the light spot incident on the reflecting layer of the optical disk is smaller.

Figure 13:
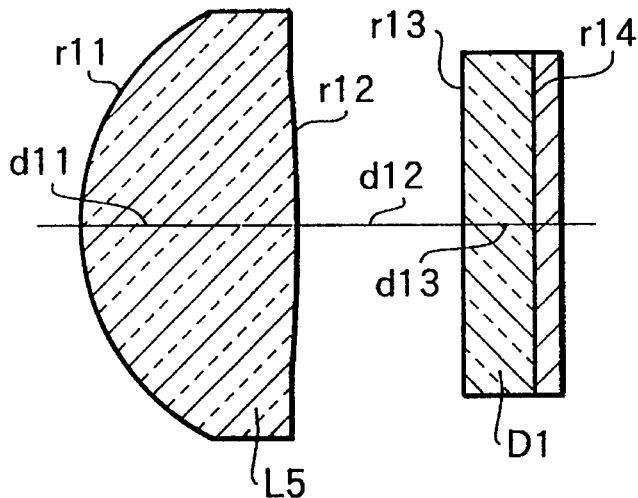
FIG. 13 is a schematic of an optical system having an optical disk and an objective lens system according to a third embodiment of the present invention.

FIG. 13 shows an objective lens L5 according to a third embodiment of the present invention, and a substrate D1 of an optical disk.

The lens L5 has radii of curvature r11 and r12, a refractive index (at a wavelength of 650 mm) n11, a thickness d11, an Abbe number v11, and a refractive index (at a wavelength of 588 nm, i.e., the d-line) $n_{d11}$. The surfaces of the lens L5 are both aspherical surfaces. The lens L5 also has a numerical aperture NA5, a focal length f5, and a half angle of view ω5. A back focal length fb5 for only the lens L5, without the substrate D1, is also given.

The substrate D1 has radii of curvature r13 and r14. The substrate D1 has a refractive index (at a wavelength of 650 nm) n13, a thickness d13, an Abbe number v13 and a refractive index (at a wavelength of 588 nm, i.e., the d-line) $n_{d13}$. Further, d12 denotes a distance between lens L5 and the substrate D1, along the optical axis.

Table 6 below summarizes the values for the above variables for the lens L5, and the substrate D1.

TABLE 6

| # | NA5 = 0.60 | f5 = 3.00 | ω5 = 1.7° | fb5 = 1.88 | |
|---|---|---|---|---|---|
| # | r# | d | n# | vd# | $n_{d\#}$ |
| 11 | 1.814 | 1.930 | 1.54082 | 55.6 | 1.54358 |
| 12 | −9.628 | 1.500 | | | |
| 13 | ∞ | 0.600 | 1.58030 | 29.9 | 1.58547 |
| 14 | ∞ | | | | |

The surfaces of the lens L5 are given by equation (1) above. In the third embodiment, the coefficients A4 through A10 and K are shown in Table 7 below.

TABLE 7

| First Surface (r11) | Second Surface (r12) |
|---|---|
| K = −0.36000 | K = 0.00000 |
| A4 = −0.22800 × $10^{-2}$ | A4 = 0.20290 × $10^{-1}$ |
| A6 = −0.39300 × $10^{-3}$ | A6 = −0.53200 × $10^{-2}$ |
| A8 = −0.66100 × $10^{-4}$ | A8 = 0.12900 × $10^{-2}$ |
| A10 = −0.18500 × $10^{-4}$ | A10 = −0.11500 × $10^{-3}$ |

With the lens L5 designed according to the above parameters, the coma of only the lens L5 is corrected, while the spherical aberration is corrected for the whole system.

Figures 14A, 14B:
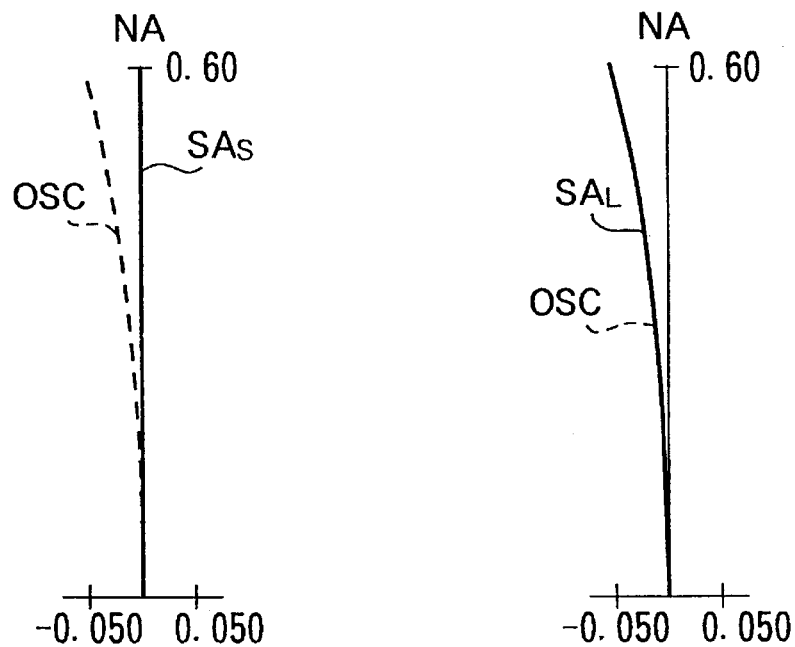
FIG. 14A is a graph showing the spherical aberration and the offense against the sine condition of the optical system shown in FIG. 13.
FIG. 14B is a graph showing the spherical aberration and the sine condition of only the objective lens system shown in FIG. 13.

FIG. 14A shows the spherical aberration $SA_S$ and the offense against the sine condition OSC for the whole optical system (i.e., the lens L5 and the substrate D1). Since the spherical aberration $SA_S$ is corrected for the whole optical system, as described above, the amount of spherical aberration is low.

FIG. 14B shows the spherical aberration $SA_L$ and the offense against the sine condition OSC for only the objective lens L5.

In the third embodiment, the thickness of the substrate D1 (i.e., d13) is 0.6 mm, and the height of the effective aperture of the lens L5 is 1.8 mm.

Table 8 shows the values of the OSC and the value of $-OSC/SA_D$ for light incident on the lens L5 at different normalized distances from the optical axis. The corresponding values for the height (D/2) and Sin α are also given.

TABLE 8

| Normalized distance of light from opt. axis | Height (D/2) | Sin α | OSC | −$SA_D$ | −OSC/$SA_D$ |
|---|---|---|---|---|---|
| 1.0 | 1.800 | 0.6000 | −0.0534 | −0.0514 | 1.0397 |
| 0.9 | 1.620 | 0.5400 | −0.0406 | −0.0397 | 1.0236 |
| 0.8 | 1.440 | 0.4800 | −0.0307 | −0.0301 | 1.0200 |
| 0.7 | 1.260 | 0.4200 | −0.0226 | −0.0223 | 1.0147 |
| 0.6 | 1.080 | 0.3600 | −0.0160 | −0.0159 | 1.0060 |
| 0.5 | 0.900 | 0.3000 | −0.0108 | −0.0108 | 1.0010 |
| 0.4 | 0.720 | 0.2400 | −0.0068 | −0.0068 | 1.0033 |
| 0.3 | 0.540 | 0.1800 | −0.0038 | −0.0038 | 1.0110 |
| 0.2 | 0.360 | 0.1200 | −0.0017 | −0.0017 | 1.0279 |
| 0.1 | 0.180 | 0.0600 | −0.0004 | −0.0004 | 0.9732 |

As shown in Table 8, equation (4) will be satisfied for all light rays incident on the lens L5.

Further, coma is given by the difference between the spherical aberration curve and the sine condition curve. As shown in FIG. 15B, the coma of the objective lens L5 has been corrected. Therefore, the effect on the wavefront aberration by the coma will be small.

Figure 15A:
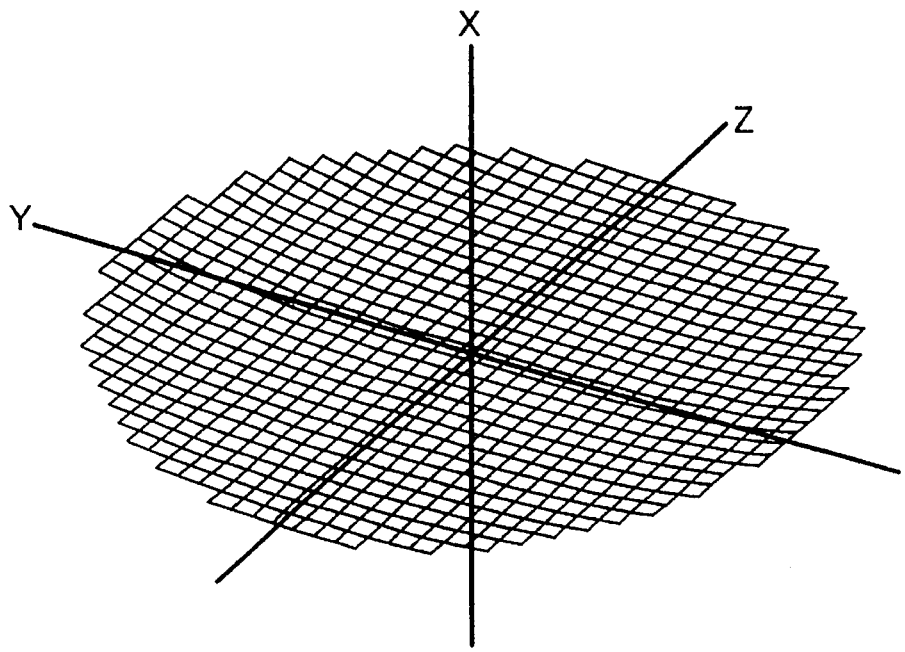
FIG. 15A is a three dimensional graph showing the wavefront pattern when the optical axis of the objective lens system shown in FIG. 13 is inclined with respect to a normal to the optical disk, by 0.5°.
Figure 15B:
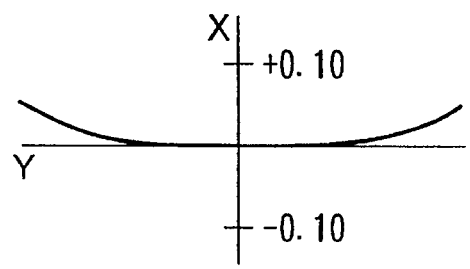
FIGS. 15B and 15C show XY and XZ sections, respectively, of the three dimensional wavefront pattern shown in FIG. 15A.
Figure 15C:
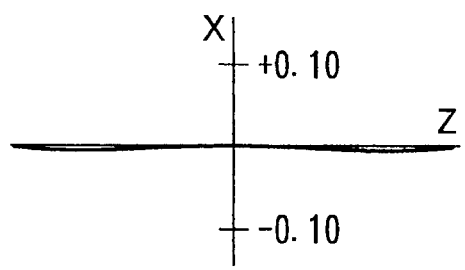

FIG. 15A shows a three dimensional graph of the wavefront patterns when the optical axis of the objective lens L5 is inclined with respect to the normal of the optical disk by 0.5 degrees. FIG. 15B shows an XY section of the pattern shown in FIG. 15A, while FIG. 15C shows an XZ section of the pattern shown in FIG. 15A.

In this case the average amount of wavefront aberration is about 0.011λ (rms), as shown in FIG. 4. Further, the maximum amount of wavefront aberration is less than 0.1λ, as shown in FIG. 15B.

As described above, by using the objective lens of the optical system of the third embodiment, the spot diameter of the light incident on the reflecting surface of the optical disk can be kept small, even if the optical axis of the objective lens is inclined with respect to the normal of the optical disk during the tracking operation or the focusing operation. Therefore, the probability that a reading error or a writing error will occur, is reduced.

Further, as the objective lens does not need to be accurately aligned with respect to the plane of the optical disk, the amount of time and cost required to assemble the optical system can be reduced.

The present disclosure relates to subject matter contained in Japanese patent application No. Hei 6-333159 (filed on Dec. 14, 1994) which is expressly incorporated herein by reference in its entirety.

What is claimed is:

1. An objective lens system used in an optical system of an optical disk device, said objective lens system converging light emitted from a light source onto a reflecting layer of an optical disk, said objective lens system comprising at least one lens element;

said lens element having an offense against the sine condition OSC, said optical disk having a substrate thickness T and a refractive index n, wherein a ray of said light exits said lens element and intersects an optical axis of said lens element with an angle α;

wherein for light rays that are incident on the objective lens system at distances from an optical axis of the objective lens system which are at least equal to a predetermined percentage of a height of an effective aperture of the objective lens system α, OSC, n and T satisfy the following relationship:

$$0.5 < OSC / \left[ -\left( \frac{1}{n} - \sqrt{\frac{1 - \sin^2\alpha}{n^2 - \sin^2\alpha}} \right) \cdot T \right] < 1.5$$

wherein a spherical aberration of the optical lens system is corrected; and wherein an offense against the sine condition of only said lens element is substantially coincident with a spherical aberration of said lens element such that a coma of only said lens element is corrected.

2. The objective lens system according to claim 1, wherein said relationship is satisfied for light rays incident on the objective lens system at distances from said optical axis which are equal to at least 70% of said height of said effective aperture.

3. The objective lens system according to claim 1, wherein said at least one lens element comprises a single positive lens.

4. The objective lens system according to claim 1, wherein said at least one lens element comprises three lenses.

5. An objective lens system used in an optical system of an optical disk device, said objective lens system converging light emitted from a light source onto a reflecting layer of an optical disk, said objective lens system comprising three lens elements;

said objective lens system having an offense against the sine condition OSC, said optical disk having a substrate thickness T and a refractive index n, wherein a ray of said light exits the objective lens system and intersects and optical axis of the objective lens system with an angle α;

wherein for light rays that are incident on the objective lens system at distances from said optical axis of the objective lens system which are at least equal to a predetermined percentage of a height of an effective aperture of the objective lens system, α, OSC, n and T satisfy the following relationship:

$$0.5 < OSC / \left[ -\left( \frac{1}{n} - \sqrt{\frac{1 - \sin^2\alpha}{n^2 - \sin^2\alpha}} \right) \cdot T \right] < 1.5$$

wherein a spherical aberration of the optical system is corrected; and wherein an offense against the sine condition of only the objective lens system is substantially coincident with a spherical aberration of the objective lens system such that a coma of only the objective lens system is corrected.

6. The objective lens system according to claim 5, wherein two of said three lens elements are positive lenses, and one of said three lens elements in a negative lens.

7. The objective lens system according to claim 5, wherein said relationship is satisfied for light rays incident on the objective lens system at distances from said optical axis which are equal to at least 70% of said height of said effective aperture.

8. An objective lens system used in an optical system of an optical disk device, said objective lens system converging light emitted from a light source onto a reflecting layer of an optical disk, said objective lens system comprising at least one lens element, said lens element having an offense against the sine condition OSC, said optical disk having a substrate thickness T and a refractive index n, wherein a ray of said light exits said lens element and intersects an optical axis of said lens element with an angle α, wherein for light rays which are incident on a portion of said objective lens, α, OSC, n and T satisfy the following relationship:

$$0.5 < OSC / \left[ -\left( \frac{1}{n} - \sqrt{\frac{1 - \sin^2\alpha}{n^2 - \sin^2\alpha}} \right) \cdot T \right] < 1.5$$

wherein a spherical aberration of the optical system is corrected, and wherein an offense against the sine condition of only said objective lens is substantially coincident with a spherical aberration of said objective lens such that a coma of only said objective lens is corrected.

9. The objective lens system according to claim 8, wherein said relationship is satisfied for light rays incident on said portion of said objective lens system that are at distances from said optical axis which are equal to at least 70% of the height of said effective aperture.

10. The objective lens system according to claim 8, wherein said at least one lens element comprises a single positive lens.

11. The objective lens system according to claim 8, wherein said at least one lens element comprises three lenses.

* * * * *

UNITED STATES PATENT AND TRADEMARK OFFICE
CERTIFICATE OF CORRECTION

PATENT NO. : 5,600,494

DATED : February 4, 1997

INVENTOR(S) : W. KUBO et al.

It is certified that error appears in the above-indentified patent and that said Letters Patent is hereby corrected as shown below:

At column 13, line 46 (claim 5, line 10), change "and" to ---an---.

Signed and Sealed this

Sixth Day of May, 1997

Attest:

BRUCE LEHMAN

*Attesting Officer*   *Commissioner of Patents and Trademarks*